United States Patent
Lee

(10) Patent No.: US 12,250,182 B2
(45) Date of Patent: Mar. 11, 2025

(54) METHOD, DEVICE, AND NON-TRANSITORY COMPUTER-READABLE RECORDING MEDIUM FOR CREATING CHATBOT SCENARIO CONSIDERING RESPONSE RATE

(71) Applicant: LINE Plus Corporation, Seongnam-si (KR)

(72) Inventor: Sunho Lee, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 18/334,916

(22) Filed: Jun. 14, 2023

(65) Prior Publication Data

US 2023/0412531 A1 Dec. 21, 2023

(30) Foreign Application Priority Data

Jun. 20, 2022 (KR) .......... 10-2022-0074554

(51) Int. Cl.
| | | |
|---|---|---|
| *H04L 51/02* | (2022.01) | |
| *G06F 16/332* | (2019.01) | |
| *G06F 16/3329* | (2025.01) | |
| *G06F 17/18* | (2006.01) | |
| *G06N 20/00* | (2019.01) | |
| *G06Q 10/04* | (2023.01) | |
| *G06Q 50/10* | (2012.01) | |
| *G06Q 50/50* | (2024.01) | |

(52) U.S. Cl.
CPC .......... *H04L 51/02* (2013.01); *G06F 16/3329* (2019.01); *G06F 17/18* (2013.01); *G06N 20/00* (2019.01); *G06Q 10/04* (2013.01); *G06Q 50/10* (2013.01); *G06Q 50/50* (2024.01)

(58) Field of Classification Search
CPC ..... H04L 51/02; G06F 16/3329; G06F 17/18; G06N 20/00; G06Q 10/04; G06Q 50/10; G06Q 50/50
See application file for complete search history.

(56) References Cited

U.S. PATENT DOCUMENTS

| | | | | |
|---|---|---|---|---|
| 2018/0196796 A1* | 7/2018 | Wu | ................. | G06F 40/289 |
| 2019/0158610 A1* | 5/2019 | Holzband | ............ | H04L 51/216 |
| 2020/0104702 A1* | 4/2020 | Zhang | ................. | G06N 3/045 |
| 2020/0105381 A1* | 4/2020 | Zhang | ................. | G06F 17/18 |
| 2021/0029064 A1* | 1/2021 | Higgins | ............ | G06N 20/00 |
| 2022/0318518 A1* | 10/2022 | Mars | ................. | G06N 5/04 |

FOREIGN PATENT DOCUMENTS

KR 10-1944353 B1 4/2019

* cited by examiner

*Primary Examiner* — Thomas J Dailey
(74) *Attorney, Agent, or Firm* — Sughrue Mion, PLLC

(57) ABSTRACT

A method, a device, and a non-transitory computer-readable recording medium are provided for creating a chatbot scenario in consideration of a response rate. A chatbot scenario creation method may include obtaining chatbot sentence components and at least one chatbot sentence including the chatbot sentence components from a chatbot; predicting a response rate of a user for at least one chatbot sentence based on a predicted response rate preset for each of chatbot sentence components; and providing the predicted response rate of the user for the at least one chatbot sentence.

19 Claims, 12 Drawing Sheets

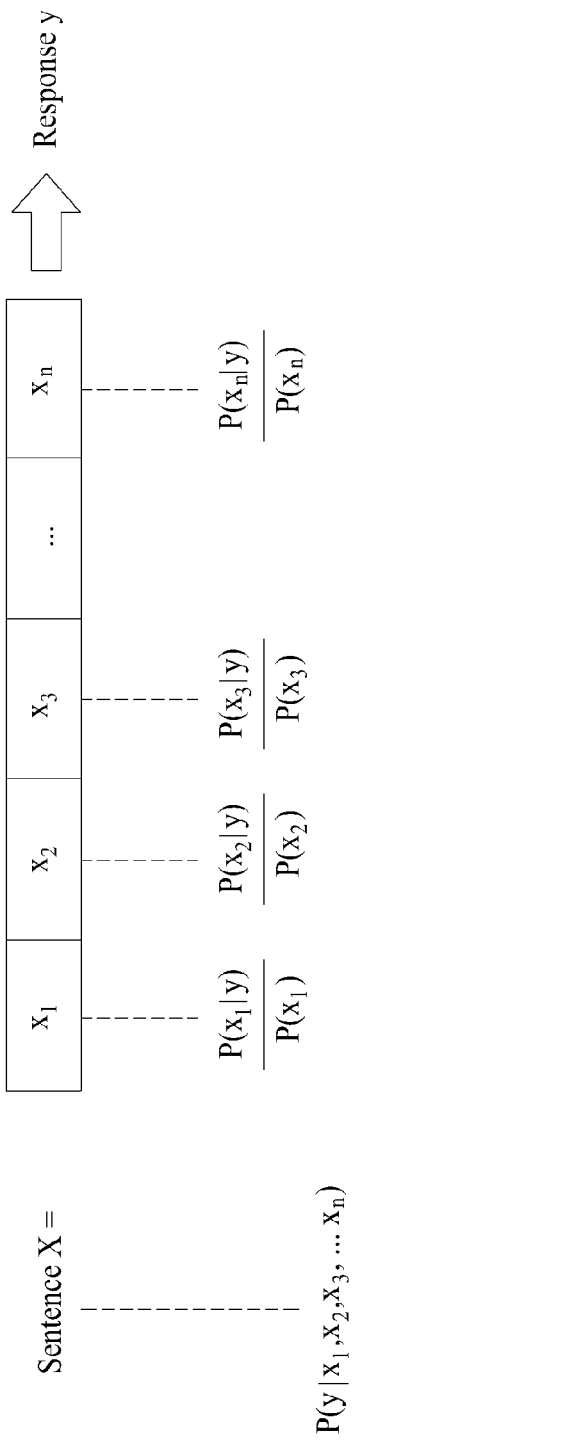

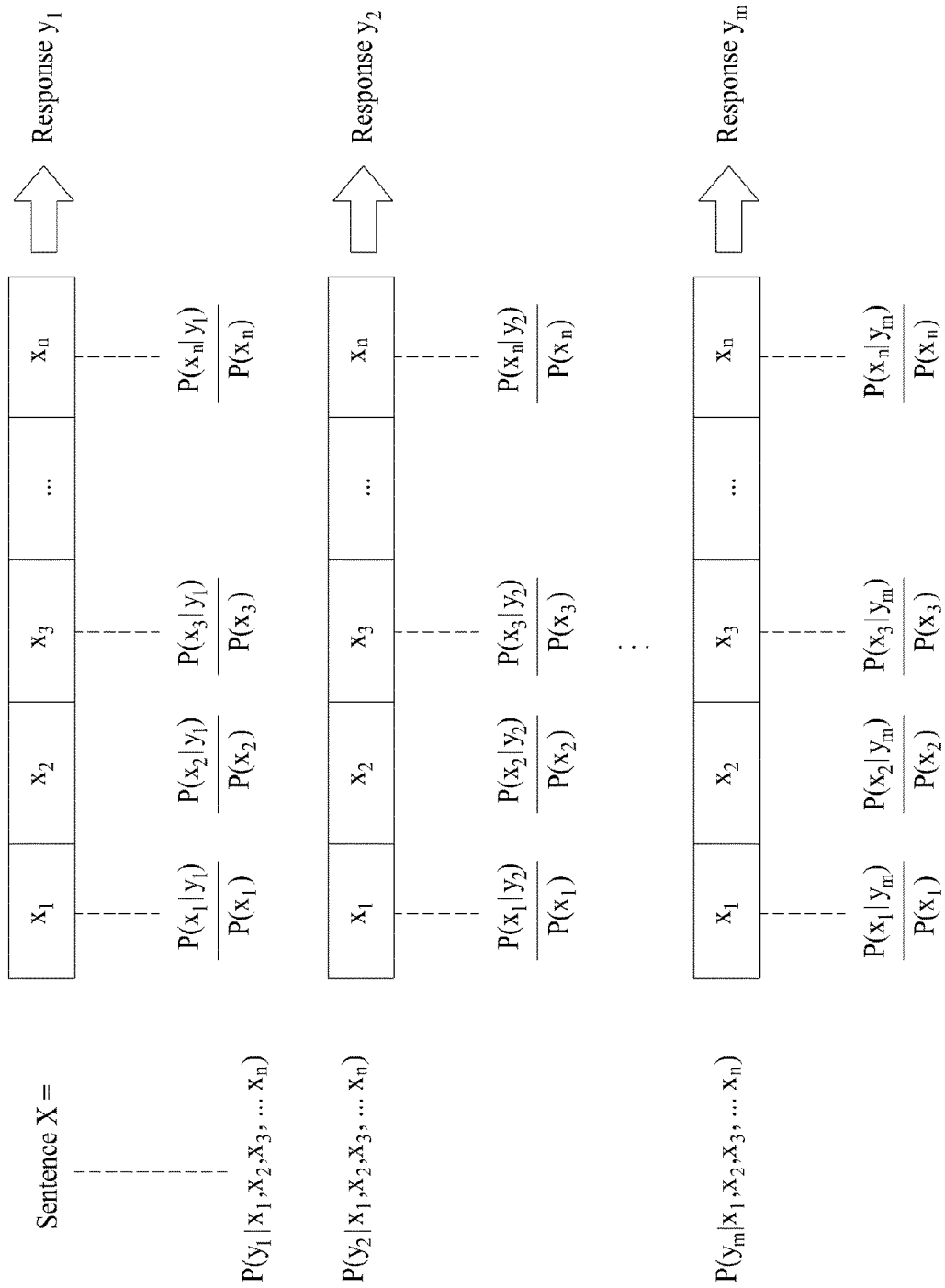

METHOD, DEVICE, AND NON-TRANSITORY COMPUTER-READABLE RECORDING MEDIUM FOR CREATING CHATBOT SCENARIO CONSIDERING RESPONSE RATE

CROSS-REFERENCE TO RELATED APPLICATION(S)

This U.S. non-provisional application claims the benefit of priority under 35 U.S.C. § 119 to Korean Patent Application No. 10-2022-0074554, filed Jun. 20, 2022 in the Korean Intellectual Property Office (KIPO), the disclosure of which is incorporated herein by reference in its entirety.

BACKGROUND

1. Field

One or more example embodiments relate to creating a chatbot scenario in consideration of a response rate.

2. Description of Related Art

A chatbot refers to an interactive messenger that engages in conversation with a user through a chat interface. The chatbot operates according to a chatbot scenario of outputting a chatbot sentence and, as a user inputs a response sentence as a response event in response thereto, outputting another chatbot sentence that responds to the response sentence of the user. Chatbots have gained attention due to their potential to replace customer centers operated by companies for providing customer service.

However, the existing technology for creating chatbot scenarios focuses on search for and generation of chatbot sentences capable of appropriately responding to a user input, without considering a response rate at which the user generates a response event to a chatbot sentence output from a chatbot.

Therefore, the existing chatbot scenario creation technology may degrade the satisfaction of a user that utilizes a customer service from a company through a chatbot and may also decrease advertising effect when advertisements of the company are exposed through the chatbot since the user satisfaction decreases.

SUMMARY

Example embodiments provide a method, a device, and a non-transitory computer-readable recording medium for creating a chatbot scenario in consideration of a predicted response rate by providing a predicted response rate of a user for a chatbot sentence to improve a user satisfaction for a customer service provided through a chatbot and to improve advertising effect for advertising of a company exposed through the chatbot.

Also, example embodiments provide a method, a device, and a non-transitory computer-readable recording medium that may apply a predicted response rate of each of response sentence components in a process of creating a chatbot scenario by using, as a predicted response rate, a probability that a response event occurs from a user and also using, as the predicted response rate, a probability that each of the response sentence components is input as the response event from the user.

Also, example embodiments provide a method, a device, and a non-transitory computer-readable recording medium that may recommend a recommended chatbot sentence or a recommended chatbot sentence component in a process of creating a chatbot scenario based on a predicted response rate of a user for a chatbot sentence.

According to an aspect of at least one example embodiment, there is provided a method of creating a chatbot scenario, performed by a computer device including at least one processor, the method including obtaining chatbot sentence components and at least one chatbot sentence including the chatbot sentence components from a chatbot; predicting a response rate of a user for the at least one chatbot sentence based on a predicted response rate that is predetermined for each of the chatbot sentence components; and providing the predicted response rate for the at least one chatbot sentence.

The predicted response rate may be represented by a probability that a response event occurs from the user.

The predicted response rate for each of the chatbot sentence components may be calculated in advance based on a probability that the response event occurred from users for each of the chatbot sentence components in a past scenario provided from the chatbot or a probability that the response event occurred from the users for each of the chatbot sentence components included in advertising texts.

The providing may further include updating the predicted response rate for each of the chatbot sentence components that constitute the at least one chatbot sentence based on a result of the response event occurring from the user as the at least one chatbot sentence is provided to the user.

The providing may further include recommending at least one recommended chatbot sentence or at least one recommended chatbot sentence component based on the predicted response rate for the at least one chatbot sentence or the predicted response rate for each of the chatbot sentence components.

The predicting may include predicting the predicted response rate of the user for the at least one chatbot sentence by applying a Naïve bayes method based on the predicted response rate preset for each of the chatbot sentence components.

The predicted response rate may be represented by a probability that each of response sentence components is to be input as a response event from the user.

The predicted response rate for each of the chatbot sentence components may be calculated in advance based on a probability that each of the response sentence components is input as the response event from users for each of the chatbot sentence components in a past scenario provided from the chatbot or a probability that each of the response sentence components is input as the response event from the users for each of the chatbot sentence components included in advertising texts.

The providing may further include updating the predicted response rate for each of chatbot sentence components that constitute the at least one chatbot sentence based on a result of inputting a specific response sentence component as the response event from the user as the at least one chatbot sentence is provided to the user.

The predicting may include predicting the predicted response rate of each of the response sentence components capable of being input as the response event from the user in response to the at least one chatbot sentence, and the providing may include providing the predicted response rate of each of the response sentence components that respond to the at least one chatbot sentence.

The providing may further include providing at least one specific sentence component having the predicted response rate greater than or equal to a preset value among the response sentence components or a combination thereof.

The providing may further include recommending at least one recommended chatbot sentence or at least one recommended chatbot sentence component based on the predicted response rate of each of the response sentence components for the at least one chatbot sentence or the predicted response rate of each of the response sentence components for each of the chatbot sentence components.

According to an aspect of at least one example embodiment, there is provided a non-transitory computer-readable recording medium storing instructions that, when executed by a processor, cause the processor to execute a method of creating a chatbot scenario, the method including obtaining chatbot sentence components and at least one chatbot sentence including the chatbot sentence components from a chatbot; predicting a response rate of a user for at least one chatbot sentence based on a predicted response rate that is predetermined for each of the chatbot sentence components; and providing the predicted response rate for the at least one chatbot sentence.

According to an aspect of at least one example embodiment, there is provided a computer device for performing a method of creating a chatbot scenario, the computer device including at least one processor configured to execute computer-readable instructions. The at least one processor includes a predictor configured to obtain chatbot sentence components and at least one chatbot sentence including the chatbot sentence components from a chatbot; predict a response rate of a user for at least one chatbot sentence based on a predicted response rate that is predetermined for each of the chatbot sentence components; and provide the predicted response rate for the at least one chatbot sentence.

The predicted response rate may be represented by a probability that a response event occurs from the user.

The predicted response rate for each of the chatbot sentence components may be calculated in advance based on a probability that the response event occurred from users for each of the chatbot sentence components in a past scenario provided from the chatbot or a probability that the response event occurred from the users for each of the chatbot sentence components included in advertising texts.

The at least one processor may be configured to recommend at least one recommended chatbot sentence or at least one recommended chatbot sentence component based on the predicted response rate for the at least one chatbot sentence or the predicted response rate for each of the chatbot sentence components.

The predicted response rate may be represented by a probability that each of response sentence components is to be input as a response event from the user.

The predicted response rate for each of the chatbot sentence components may be calculated in advance based on a probability that each of the response sentence components is input as the response event from users for each of the chatbot sentence components in a past scenario provided from the chatbot or a probability that each of the response sentence components is input as the response event from the users for each of the chatbot sentence components included in advertising texts.

The at least one processor may be configured to predict the predicted response rate of each of the response sentence components capable of being input as the response event from the user in response to the at least one chatbot sentence, and to provide the predicted response rate of each of the response sentence components that respond to the at least one chatbot sentence.

The at least one processor may be configured to provide at least one specific sentence component having the predicted response rate greater than or equal to a preset value among the response sentence components or a combination thereof.

The at least one processor may be configured to recommend at least one recommended chatbot sentence or at least one recommended chatbot sentence component based on the predicted response rate of each of the response sentence components for the at least one chatbot sentence or the predicted response rate of each of the response sentence components for each of the chatbot sentence components.

According to some example embodiments, there may be provided a method, a device, and a non-transitory computer-readable recording medium for creating a chatbot scenario in consideration of a predicted response rate by providing a predicted response rate of a user for a chatbot sentence.

Also, according to some example embodiments, it is possible to improve a user satisfaction for a customer service provided through a chatbot and to improve advertising effect for advertising of a company exposed through the chatbot.

Also, according to some example embodiments, there may be provided provide a method, a device, and a non-transitory computer-readable recording medium that may apply a predicted response rate of each of response sentence components in a process of creating a chatbot scenario by using, as a predicted response rate, a probability that a response event occurs from a user and also using, as the predicted response rate, a probability that each of the response sentence components is input as the response event from the user.

Also, according to some example embodiments, there may be provided a method, a device, and a non-transitory computer-readable recording medium that may recommend a recommended chatbot sentence or a recommended chatbot sentence component in a process of creating a chatbot scenario based on a predicted response rate of a user for a chatbot sentence.

BRIEF DESCRIPTION OF DRAWINGS

The above and/or other aspects will be more apparent by describing certain example embodiments, with reference to the accompanying drawings, in which:

FIG. 5 illustrates an example of predicting a predicted response rate of a user for at least one chatbot sentence in the chatbot scenario creation method of FIG. 4;

FIGS. 7A and 7B illustrate another example of predicting a predicted response rate of a user for at least one chatbot sentence in the chatbot scenario creation method of FIG. 4;

Figure 1:
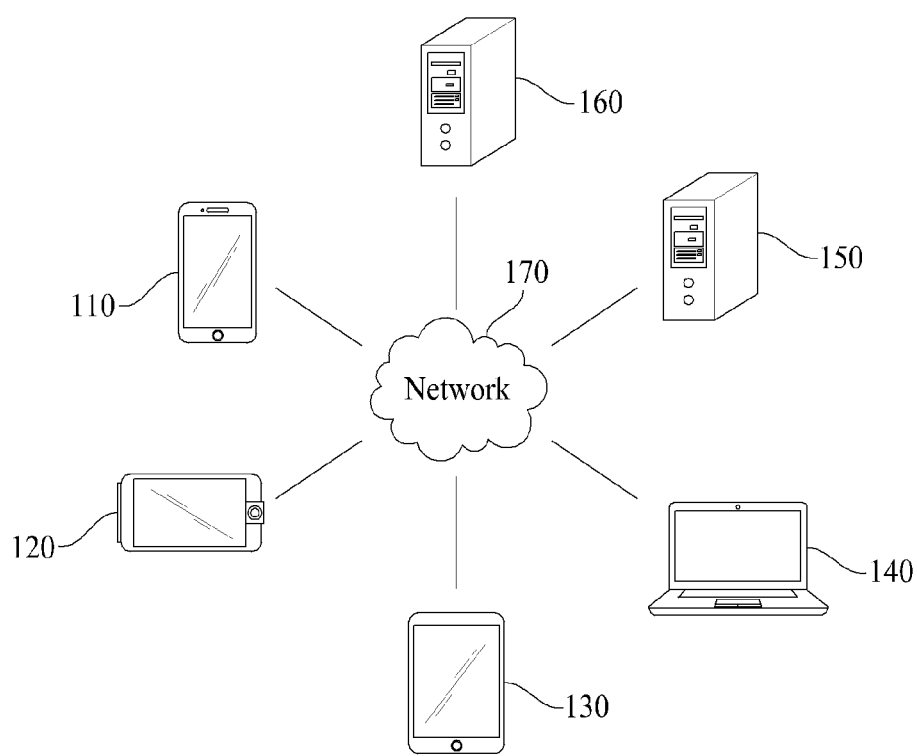
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be translated as defining or limiting the range of values or properties encompassed by example embodiments.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein translated accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be translated as having a meaning that is consistent with their meaning in the context of the relevant art and/or this disclosure, and should not be translated in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/ DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to forward and/or distribute the computer programs, program code, instructions, or some combination thereof, over a network. The remote computing system may forward and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for a method, a device, and a non-transitory computer-readable recording medium for creating a chatbot scenario.

The example embodiments including the disclosures set forth herein describe a chatbot scenario creation system (hereinafter, referred to as a creation system) for creating a chatbot scenario in consideration of a predicted response rate by providing a predicted response rate of a user for a chatbot sentence. Therefore, the example embodiments may have the technical effect of improving a user satisfaction for a customer service provided through a chatbot and improving advertising effect for advertising of a company exposed through the chatbot.

A creation system according to some example embodiments may be implemented by at least one computer device that implements a server or an electronic device, described below. A computer program according to an example embodiment may be installed and executed on the computer device and the computer device may perform a chatbot scenario creation method (hereinafter, referred to as a creation method) according to example embodiments under control of the executed computer program. The aforementioned computer program may be stored in a computer-readable recording medium to computer-implement the creation method in conjunction with the computer device. Here, the computer program may be in a form of a single independent program package and may be in a form in which a single independent program package is installed in a computer device and linked with an operating system (OS) or other program packages.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170.

FIG. 1 is provided as an example only. The number of electronic devices or the number of servers is not limited thereto. Also, the network environment of FIG. 1 is provided as one example of environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

Hereinafter, the plurality of electronic devices 110, 120, 130, and 140 may refer to terminals of a company (hereinafter, the company represents a company that desires to receive a chatbot scenario and provide a chatbot service to customers) that is provided with a chatbot scenario creation service implemented by the following creation method or terminals of a user (hereinafter, the user represents a customer that receives the chatbot service) that is provided with the chatbot service for communicating with the chatbot.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service (e.g., a chatbot scenario creation service performed by the following creation method) to the plurality of electronic devices 110, 120, 130, and 140 connected over the network 170.

Figure 2:
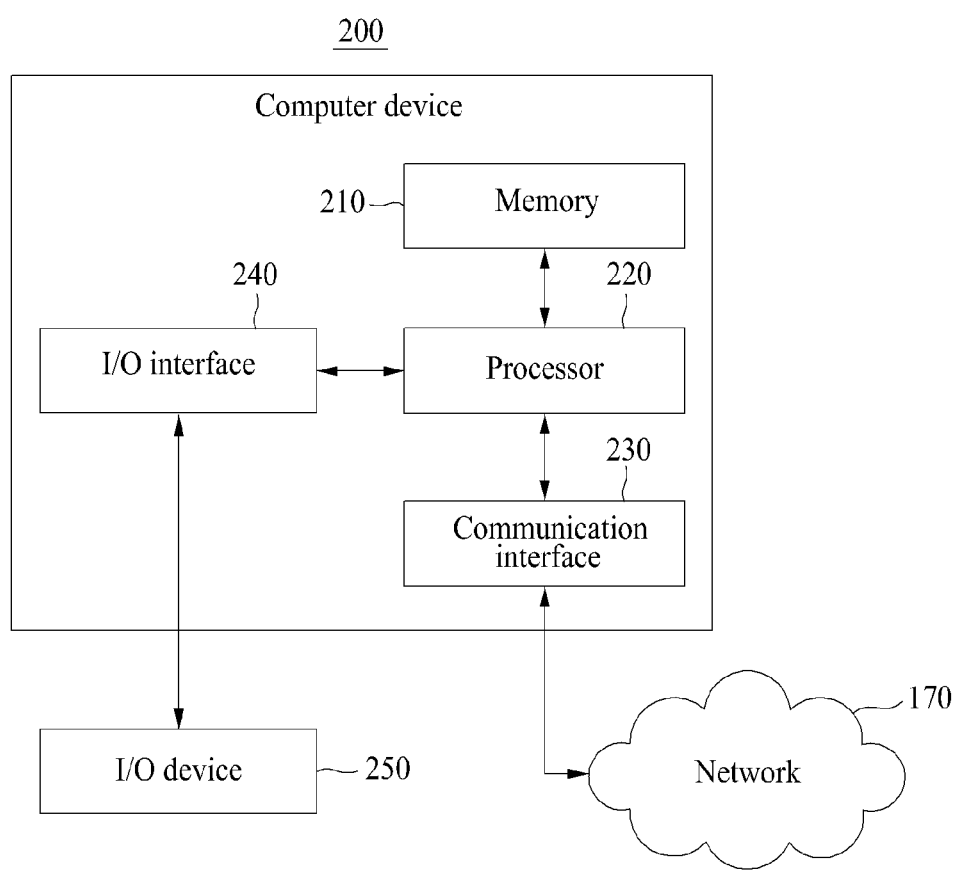
FIG. 2 is a diagram illustrating a configuration of a computer device according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable recording medium. Here, the permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another non-transitory computer-readable recording medium separate from the memory 210. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of the non-transitory computer-readable recording medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function for communication between the communication apparatus 200 and another apparatus, for example, the aforementioned storage devices, through the network 170. For example, the processor 220 of the computer device 200 may deliver a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be delivered to the processor 220 or the memory 210, and a file, etc., may be stored in a storage medium, for example, the permanent storage device, further includable in the computer device 200.

The I/O interface 240 may be a device used for interfacing with an I/O device 250. For example, an input device may include a device, such as a microphone, a keyboard, a mouse, etc., and an output device may include a device, such as a display, a speaker, etc. As another example, the I/O interface 240 may be a device for interfacing with a device in which an input function and an output function are integrated into a single function, such as a touchscreen. The I/O device 250 may be configured as a single device with the computer device 200.

Also, according to other example embodiments, the computer device 200 may include a greater or smaller number of components than the number of components of FIG. 2. However, there is no need to clearly illustrate many conventional components. For example, the computer device 200 may be configured to include at least a portion of the I/O device 250 or may further include other components, such as a transceiver and a database.

Hereinafter, example embodiments of a method, a device, and a non-transitory computer-readable recording medium for creating a chatbot scenario in consideration of a predicted response rate by providing a predicted response rate of a user for a chatbot sentence are described.

Figure 3:
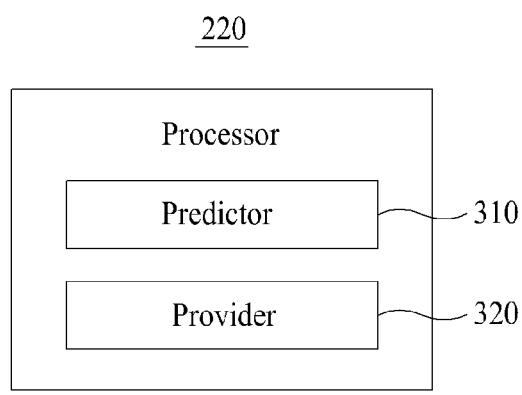
FIG. 3 is a diagram illustrating an example of a component includable in a processor of FIG. 2.
Figure 4:
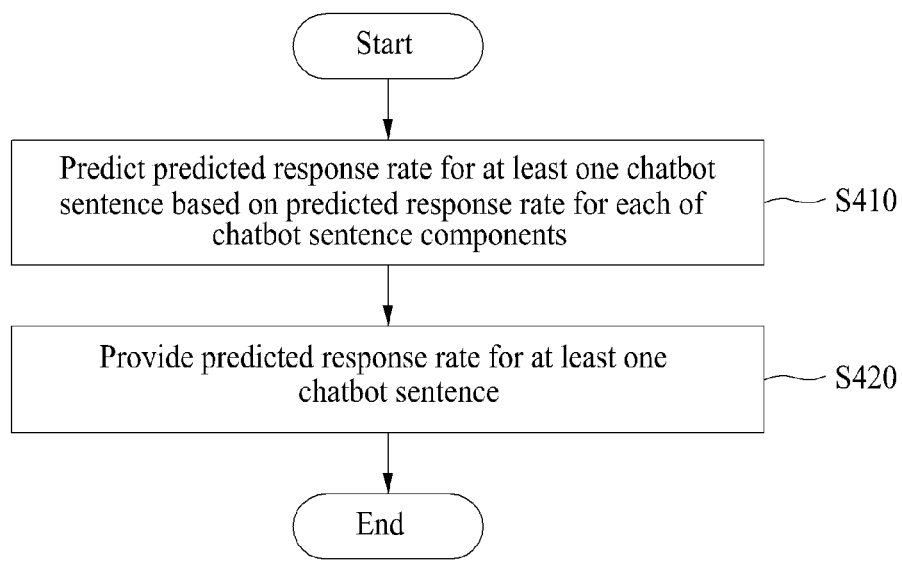
FIG. 4 is a flowchart illustrating an example of a chatbot scenario creation method performed by the computer device of FIG. 2.
Figure 6A:
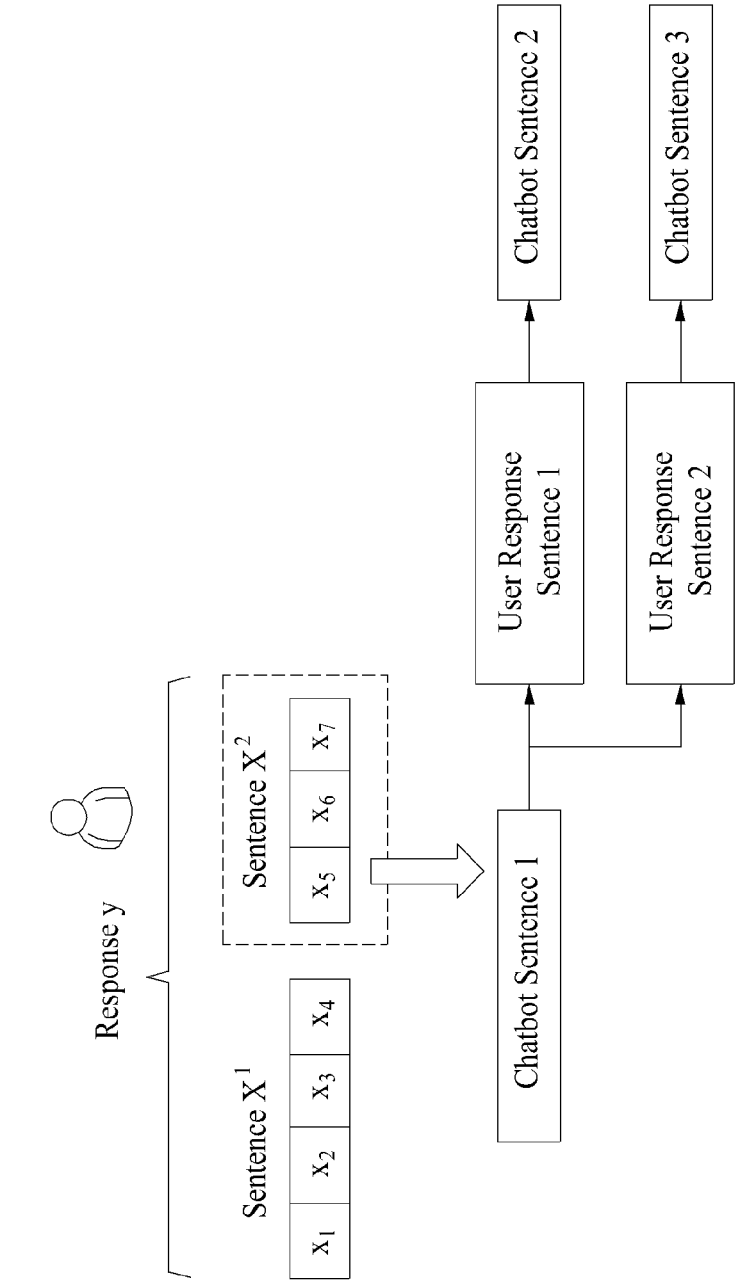
FIGS. 6A and 6B illustrate an example of creating a chatbot scenario using the predicted response rate predicted according to the example of FIG. 5.
Figure 6B:
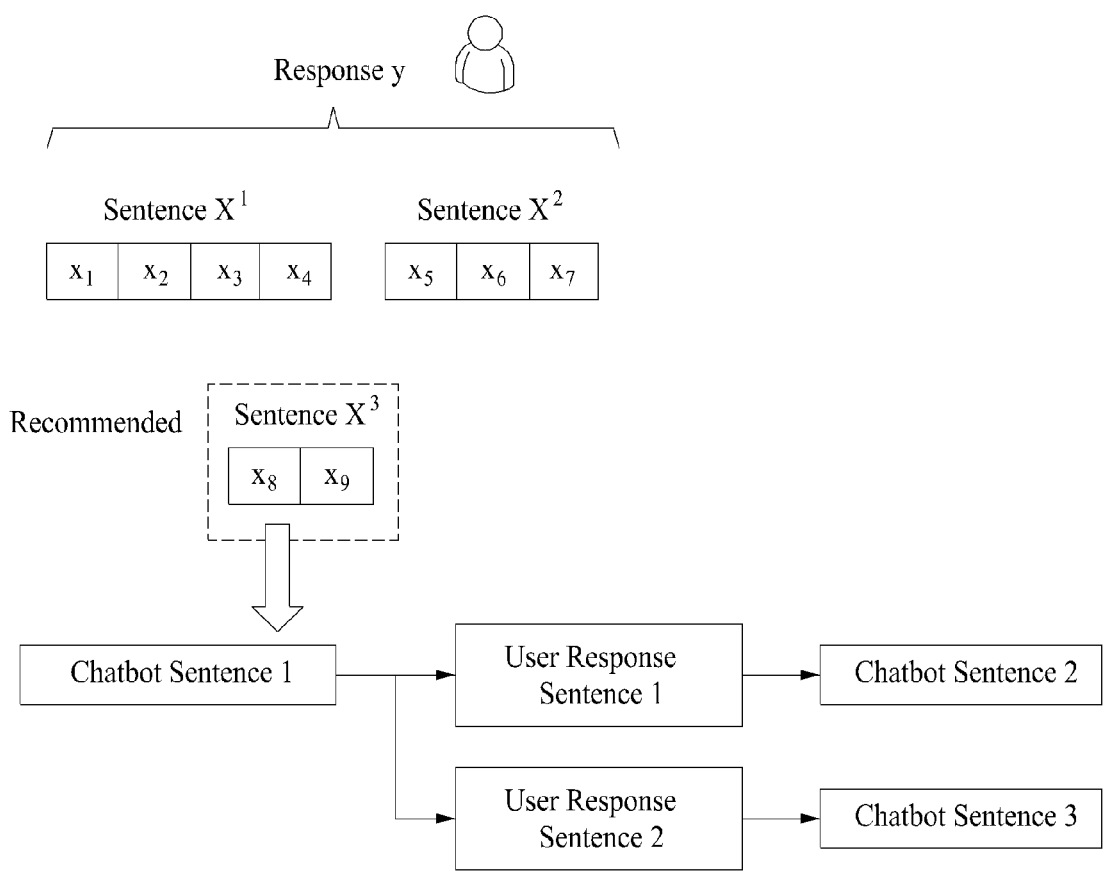

FIG. 3 is a diagram illustrating an example of components includable in a processor of FIG. 2, FIG. 4 is a flowchart illustrating an example of a chatbot scenario creation method performed by the computer device of FIG. 2, FIG. 5 illustrates an example of predicting a predicted response rate of a user for at least one chatbot sentence in the chatbot scenario creation method of FIG. 4, and FIGS. 6A and 6B illustrate an example of creating a chatbot scenario using the predicted response rate predicted according to the example of FIG. 5

The computer device 200 according to the example embodiments may provide a client (e.g., a company which wishes to use the computer device 200 to offer customer service or advertisements through a chatbot system), with a chatbot scenario creation service that creates and provides a chatbot scenario in response to a service request occurring through connection to a dedicated application installed on a server or an electronic device of the client or a website/mobile site. A computer-implemented creation system may be configured in the computer device 200 according to the example embodiment. For example, the creation system may be implemented in an independently operating program form or may be configured in an in-app form of a dedicated application to be operable on the dedicated application.

The processor 220 of the computer device 200 may be implemented as a component for performing the following creation method of FIG. 4. For example, the processor 220 may include a predictor 310 and a provider 320 of FIG. 3 to perform operations S410 and S420 of FIG. 4. Depending on example embodiments, the components of the processor 220 may be selectively included in or excluded from the processor 220. Also, depending on example embodiments, the components of the processor 220 may be separated or merged for functional representations of the processor 220.

The processor 220 and the components of the processor 220 may control the computer device 200 to perform operations S410 and S420 included in the following creation method of FIG. 4. For example, the processor 220 and the components of the processor 220 may be implemented to execute an instruction according to a code of at least one program and a code of an OS included in the memory 210.

Here, the components of the processor 220 may be representations of different functions performed by the processor 220 according to an instruction provided from a program code stored in the computer device 200. For example, the provider 320 may be used as a functional representation of the processor 220 that controls the computer device 200 to provide a predicted response rate of a user for at least one chatbot sentence.

The processor 220 may load and read a necessary instruction from the memory 210 to control the computer device 200. In this case, the read instruction may include an instruction for controlling the processor 220 to perform the following operations S410 and S420.

The following operations S410 and S420 may be performed in an order different from the order illustrated in FIG. 4. A portion of operations S410 and S420 may be omitted, or an additional process may be further included.

In operation S410, a predictor 310 included in the processor 220 may predict a predicted response rate of a user for at least one chatbot sentence that is output from a chatbot based on a predicted response rate preset for each of chatbot sentence components that are output from the chatbot. Hereinafter, the chatbot sentence components refer to sentence components, such as words, keywords, or phrases included in a chatbot sentence output from the chatbot.

Here, the predicted response rate may be represented by a probability that a response event occurs from the user. For example, the predicted response rate for each of the chatbot sentence components may be defined as a probability that the response event occurs from the user in response to each of the chatbot sentence components, and the predicted response rate for at least one chatbot sentence may be defined as a probability that the response event occurs from the user in response to the at least one chatbot sentence.

Here, the predicted response rate for each of the chatbot sentence components may be calculated in advance based on a probability that the response event occurred from users for each of the chatbot sentence components in a past scenario provided from the chatbot or a probability that the response event occurred from the users for each of the chatbot sentence components included in advertising texts. That is, the predicted response rate for each of the chatbot sentence components may be set and calculated in advance in the aforementioned manner and then stored and maintained in a database. Therefore, the processor 220 may extract the predicted response rate for each of the chatbot sentence components from the database in which the predicted response rate for each of the chatbot sentence components is set and calculated in advance and thereby stored and may use the extracted predicted response rate for each of the chatbot sentence components in operation S410.

The predicted response rate for each of the chatbot sentence components may be calculated in advance in the aforementioned manner and may also be immediately calculated in operation S410 through a neural network model that is trained through the database in which the predicted response rate for each of the chatbot sentence components is stored.

Specifically, in operation S410, when chatbot sentence X output from a chatbot includes chatbot sentence components $x_1, x_2, x_3, \ldots x_n$ as illustrated in FIG. 5, predicted response rate $P(y|x_1, x_2, x_3, \ldots x_n)$ for at least one chatbot sentence $X=\{x_1, x_2, x_3, \ldots x_n\}$ may be calculated as in the following Equation 1.

$$P(y \mid x_1, x_2, x_3, \ldots x_n) = \frac{P(x_1 \mid y)P(x_2 \mid y)P(x_3 \mid y), \ldots P(x_n \mid y)P(y)}{P(x_1)P(x_2)P(x_3), \ldots P(x_n)} \quad \text{⟨Equation 1⟩}$$

Since the chatbot sentence components $x_1, x_2, x_3, \ldots x_n$, are assumed to be mutually independent, the predicted response rate $P(y|x_1, x_2, x_3, \ldots x_n)$ for a single chatbot sentence $X=\{x_1, x_2, x_3, \ldots x_n\}$ may be decomposed from Equation 1 into $P(x_1|y)/P(x_1)$, $P(x_2|y)/P(x_2)$, $P(x_3|y)/P(x_3)$, ... $P(x_n|y)/P(x_n)$ that are ratios of corresponding conditional use probabilities $P(x_1|y)$, $P(x_2|y)$, $P(x_3|y)$, $P(x_n|y)$ of the respective chatbot sentence components $x_1$, $x_2, x_3, \ldots x_n$, assuming occurrence of response event y of the user over corresponding use probabilities $P(x_1)$, $P(x_2)$, $P(x_3) \ldots P(x_n)$ of the respective chatbot sentence components $x_1, x_2, x_3, \ldots x_n$. According to an increase in a value of $P(x_1|y)/P(x_1)$, $P(x_2|y)/P(x_2)$, $P(x_3|y)/P(x_3)$, ... $P(x_n|y)/P(x_n)$ that is a ratio of corresponding conditional use probability $P(x_1|y)$, $P(x_2|y)$, $P(x_3|y)$, ... $P(x_n|y)$ of each of the chatbot sentence components $x_1, x_2, x_3, \ldots x_n$, assuming the occurrence of the response event y of the user over corresponding use probability $P(x_1), P(x_2), P(x_3) \ldots P(x_n)$ of each of the chatbot sentence components $x_1, x_2, x_3, \ldots x_n$, a probability that the response event y occurs in response to each of the chatbot sentence components $x_1, x_2, x_3, \ldots x_n$, may increase.

Therefore, in operation S410, the processor 220 may apply a Naïve bayes method based on $P(x_1|y)/P(x_1)$, $P(x_2|y)/P(x_2)$, $P(x_3|y)/P(x_3)$, ... $P(x_n|y)/P(x_n)$ that is a ratio of corresponding conditional use probability $P(x_1|y)$, $P(x_2|y)$, $P(x_3|y)$, ... $P(x_n|y)$ of each of the chatbot sentence components $x_1, x_2, x_3, \ldots x_n$, assuming the occurrence of the response event y of the user over corresponding use probability $P(x_1)$, $P(x_2)$, $P(x_3) \ldots P(x_n)$ of each of the chatbot sentence components $x_1, x_2, x_3, x_n$ that is defined as a predicted response rate preset for each of the chatbot sentence components $x_1, x_2, x_3, \ldots x_n$ (i.e., probability that the response event y occurs or occurred from the user in response to each of the chatbot sentence components $x_1, x_2, x_3, \ldots x_n$), and may calculate and predict the predicted response rate $P(y|x_1, x_2, x_3, \ldots x_n)$ for at least one chatbot sentence $X=\{x_1, x_2, x_3, \ldots x_n\}$ that is output from the chatbot (i.e., probability that the response event y occurs from the user in response to the at least one chatbot sentence $X=\{x_1, x_2, x_3, \ldots x_n\}$).

In operation S420, a provider 320 included in the processor 220 may provide the predicted response rate of the user for the at least one chatbot sentence. Hereinafter, providing the predicted response rate of the user for the at least one chatbot sentence may represent that the processor 220 provides the predicted response rate of the user for the at least one chatbot sentence to a company, that is, a client that desires to utilize a chatbot scenario creation service.

For example, referring to FIG. 6A, when first chatbot sentence $X^1=\{x_1, x_2, x_3, x_4\}$ and second chatbot sentence $X^2=\{x_5, x_6, x_7\}$ are received from a company, that is, a client, the processor 220 may predict predicted response rate $P(y|x_1, x_2, x_3, x_4)$ of the first chatbot sentence $X^1=\{x_1, x_2, x_3, x_4\}$ and predicted response rate $P(y|x_5, x_6, x_7)$ of the second chatbot sentence $X_2=\{x_5, x_6, x_7\}$ through operation S410 and then provide the predicted response rate $P(y|x_1, x_2, x_3, x_4)$ of the first chatbot sentence $X^1=\{x_1, x_2, x_3, x_4\}$ and the predicted response rate $P(y|x_5, x_6, x_7)$ of the second chatbot sentence $X^2=\{x_5, x_6, x_7\}$ to the client through operation S420. Through this, the client is enabled to create a chatbot scenario by selecting the second chatbot sentence having a higher predicted response rate value between the first chatbot sentence $X^1=\{x_1, x_2, x_3, x_4\}$ and the second chatbot sentence $X^2=\{x_5, x_6, x_7\}$. The processor 220 may complete creation of the chatbot scenario by performing the aforementioned operation in each of sentence portions (Chatbot Sentence 1, Chatbot Sentence 2, and Chatbot Sentence 3) that are output from the chatbot in the chatbot scenario of FIG. 6A.

Also, in operation S420, the processor 220 may provide the predicted response rate of the user for the at least one chatbot sentence and may also recommend at least one recommended chatbot sentence or at least one recommended chatbot sentence component based on the predicted response rate for the at least one chatbot sentence or the predicted response rate for each of the chatbot sentence components.

For example, referring to FIG. 6B, when first chatbot sentence $X^1=\{x_1, x_2, x_3, x_4\}$ and second chatbot sentence $X^2=\{x_5, x_6, x_7\}$ are received from a company, that is, a client, the processor 220 may predict predicted response rate $P(y|x_1, x_2, x_3, x_4)$ of the first chatbot sentence $X^1=\{x_1, x_2, x_3, x_4\}$ and predicted response rate $P(y|x_5, x_6, x_7)$ of the second chatbot sentence $X^2=\{x_5, x_6, x_7\}$ through operation S410 and then provide the predicted response rate $P(y|x_1, x_2, x_3, x_4)$ of the first chatbot sentence $X^1=\{x_1, x_2, x_3, x_4\}$ and the predicted response rate $P(y|x_5, x_6, x_7)$ of the second chatbot sentence $X^2=\{x_5, x_6, x_7\}$ to the client through operation S420 and, at the same time, may recommend recommended chatbot sentence $X^3=\{x_8, x_9\}$ or recommended chatbot sentence components $x_8$ and $x_9$ having a higher predicted response rate value than the first chatbot sentence $X^1=\{x_1, x_2, x_3, x_4\}$ and the second chatbot sentence $X^2=\{x_5, x_6, x_7\}$ to the client. Therefore, the client is enabled to create a chatbot scenario by selecting the recommended chatbot sentence $X^3=\{x_8, x_9\}$. The processor 220 may complete creation of the chatbot scenario by performing the aforementioned operation in each of sentence portions (Chatbot Sentence 1, Chatbot Sentence 2, and Chatbot Sentence 3) that are output from the chatbot in the chatbot scenario of FIG. 6B.

Also, when the predicted response rate of the at least one chatbot sentence is provided to the client and a chatbot service is provided to the user according to the chatbot scenario created by the client, the processor 220 may update the predicted response rate for each of the chatbot sentence components that constitute the at least one chatbot sentence based on an occurrence result of a response event from the user in response to the at least one chatbot sentence being provided to the user. As described above, since the predicted response rate for each of the chatbot sentence components may be continuously updated with the chatbot scenario creation method being performed, prediction accuracy of the predicted response rate of the chatbot sentence may be improved.

Although it is described that the chatbot scenario creation method provides a predicted response rate of the user for at least one chatbot sentence to a client such that the client may apply the predicted response rate to the at least one chatbot sentence and may create a chatbot scenario, it is provided as an example only. Without being limited thereto or restricted thereby, at least one final chatbot sentence may be automatically generated based on the predicted response rate of the user for the at least one chatbot sentence. In this case, in operation S420, the processor 220 may create the chatbot scenario by automatically generating at least one final chatbot sentence having the highest predicted response rate based on the predicted response rate of the user for the at least one chatbot sentence. A process of automatically generating at least one final chatbot sentence may include selecting one chatbot sentence having the highest predicted response rate from among a plurality of chatbot sentences as the final chatbot sentence as described above with reference to FIG. 6A, or generating the final chatbot sentence by recommending a new chatbot sentence or chatbot sentence components having a high predicted response rate as described above with reference to FIG. 6B.

According to some example embodiments, the creation system may create a chatbot scenario in consideration of a predicted response rate by providing a predicted response rate of a user for a chatbot sentence, thereby improving a user satisfaction for a customer service provided through a chatbot and improving advertising effect for advertising of a company exposed through the chatbot.

A case in which the chatbot scenario creation method uses a predicted response rate defined as a probability that a response event occurs from a user is described above. In detail, a predicted response rate defined as a probability that each of response sentence components is input as a response event from the user may be used. Further description is made below.

Figure 7B:
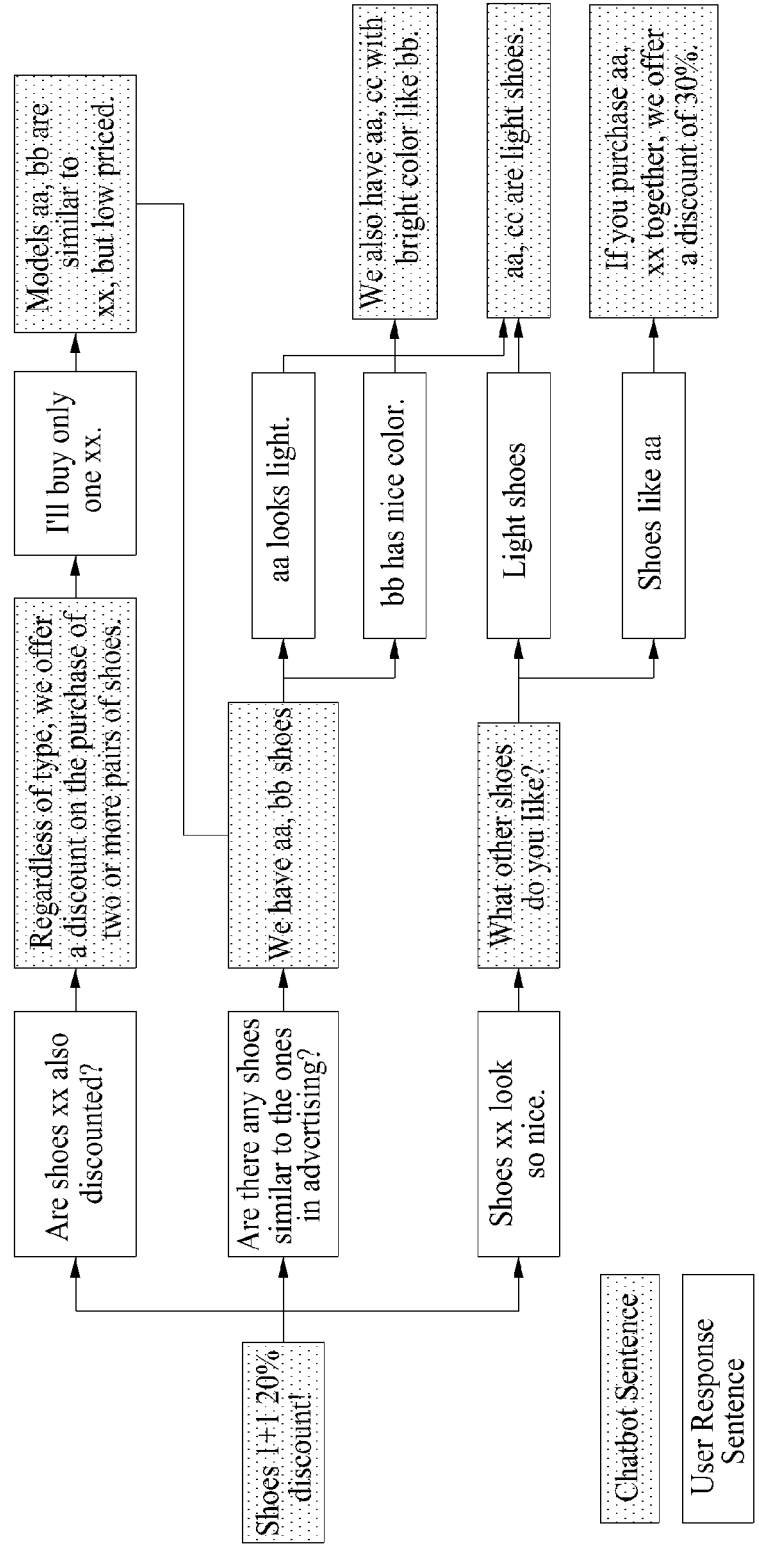
Figure 8A:
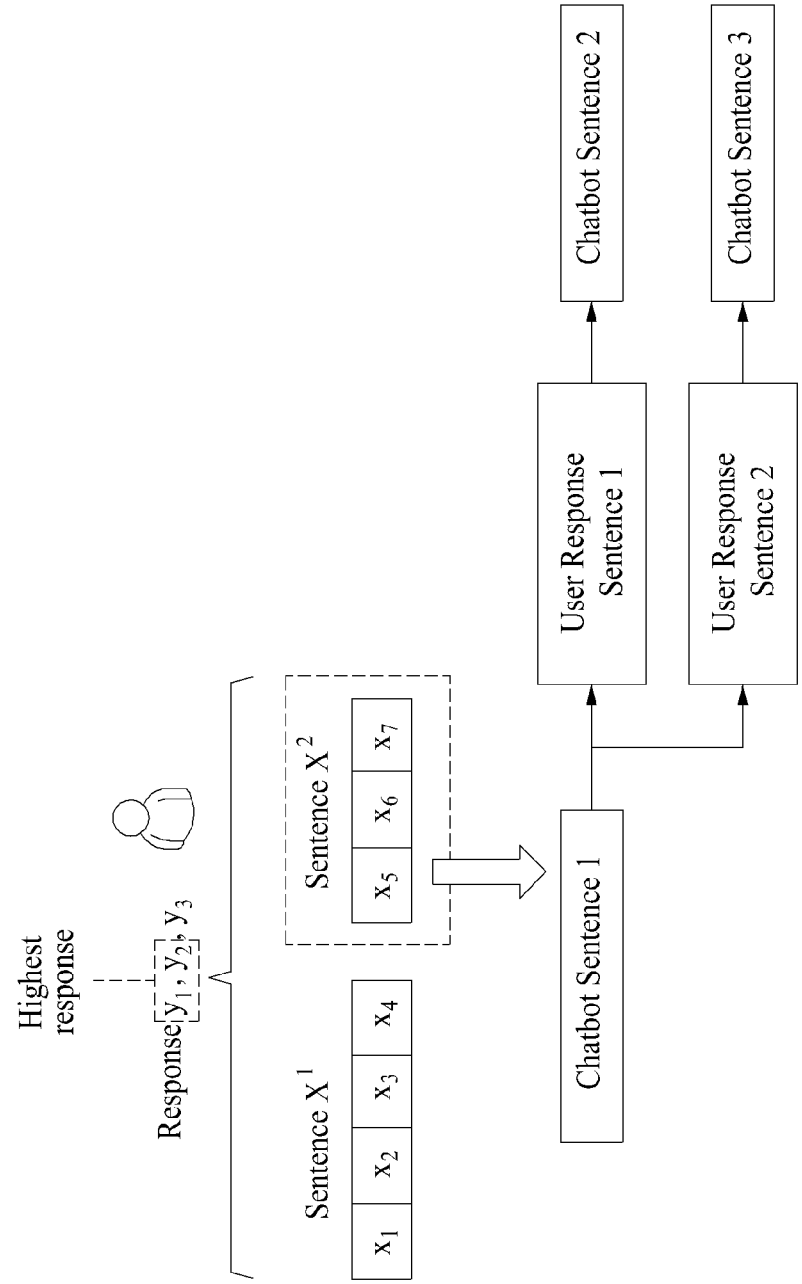
FIGS. 8A and 8B illustrate an example of creating a chatbot scenario by providing a predicted response rate predicted according to the example of FIG. 7A.
Figure 8B:
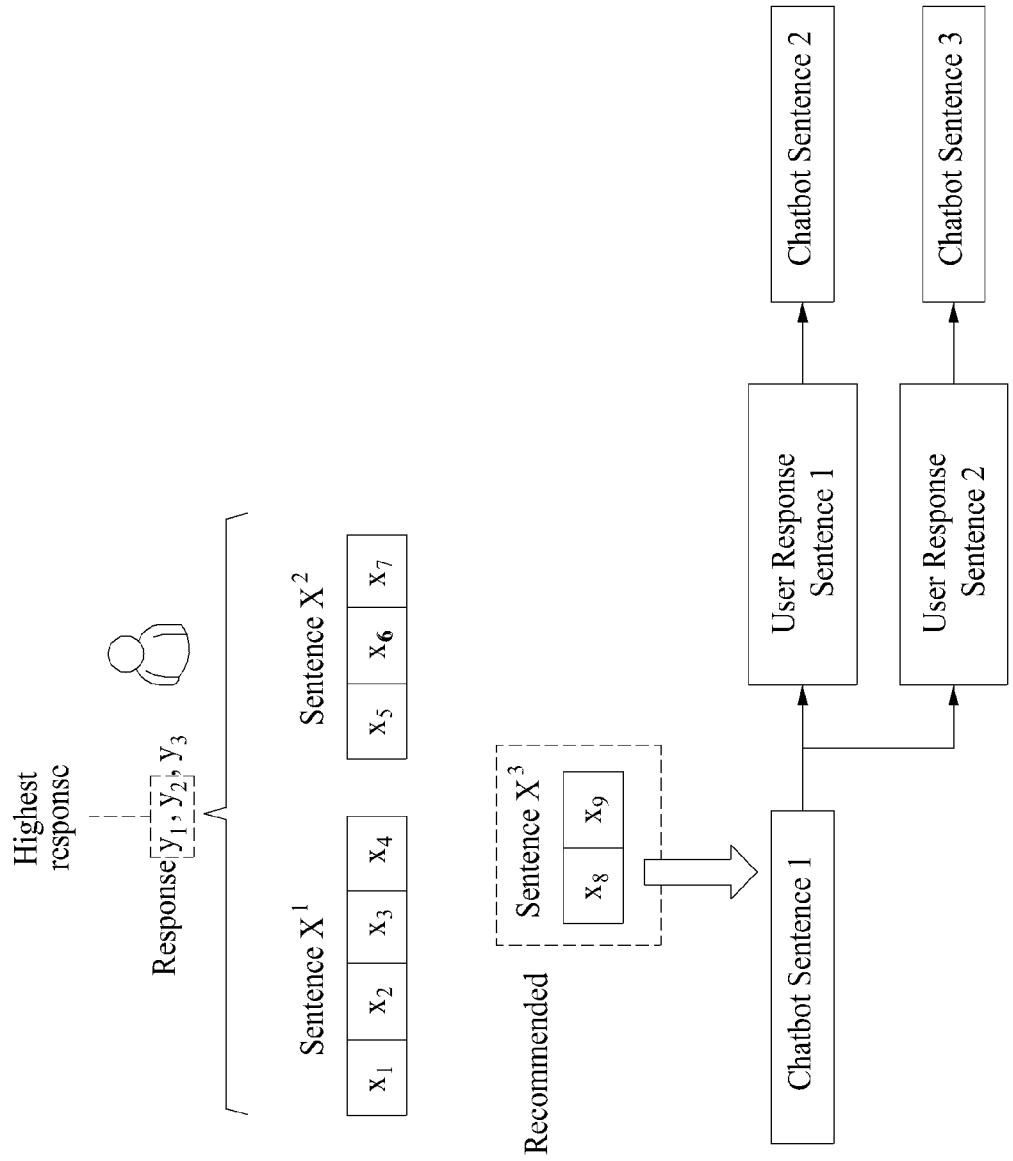

FIGS. 7A and 7B illustrate another example of predicting a predicted response rate of a user for at least one chatbot sentence in the chatbot scenario creation method of FIG. 4, and FIGS. 8A and 8B illustrate an example of creating a chatbot scenario by providing a predicted response rate predicted according to the example of FIG. 7A.

The predicted response rate used in operation S410 may be defined as a probability that each of response sentence components is input as a response event from a user. Hereinafter, response sentence components represent sentence components, such as words, keywords, or phrases input from the user in response to at least one chatbot sentence output from the chatbot. For example, the predicted response rate for each of chatbot sentence components may be defined as a probability that each of the response sentence components is input as the response event from the user in response to each of the chatbot sentence components, and the predicted response rate for at least one chatbot sentence may be defined as a probability that each of the response sentence components is input as the response event from the user in response to the at least one chatbot sentence.

As described above, the predicted response rate for each of chatbot sentence components may be calculated in advance based on a probability that each of response sentence components was input as the response event from users for each of the chatbot sentence components in a past scenario provided from the chatbot or a probability that each of the response sentence components was input as the response event from the users for each of the chatbot sentence components included in advertising texts. That is, the predicted response rate for each of the chatbot sentence components may be calculated in advance in the aforementioned manner and thereby stored and maintained in a database. Therefore, the processor 220 may extract the predicted response rate for each of the chatbot sentence components from the database in which the predicted response rate for each of the chatbot sentence components is calculated in advance and thereby stored and may use the extracted predicted response rate for each of the chatbot sentence components in operation S410.

The predicted response rate for each of the chatbot sentence components may be calculated in advance in the aforementioned manner and may also be immediately calculated in operation S410 through a neural network model that is trained through the database in which the predicted response rate for each of the chatbot sentence components is stored.

Describing operation S410 in detail, when chatbot sentence X output from a chatbot includes chatbot sentence components $x_1, x_2, x_3, \ldots x_n$ as illustrated in FIG. 7A, predicted response rate $P(y_1|x_1, x_2, x_3, \ldots x_n)$ that is a probability that response sentence component $y_1$ is input as a response event for at least one chatbot sentence $X=\{x_1, x_2, x_3, \ldots x_n\}$ may be calculated according to the following Equation 2.

$$P(y_1 \mid x_1, x_2, x_3, \ldots x_n) = \frac{P(x_1 \mid y_1)P(x_2 \mid y_1)P(x_3 \mid y_1), \ldots P(x_n \mid y_1)P(y_1)}{P(x_1)P(x_2)P(x_3), \ldots P(x_n)} \quad \langle \text{Equation 2} \rangle$$

Since the chatbot sentence components $x_1, x_2, x_3, \ldots x_n$ are assumed to be mutually independent, the predicted response rate $P(y_1|x_1, x_2, x_3, \ldots x_n)$ that is a probability that the response sentence component $y_1$ is input as the response event for the single chatbot sentence $X=\{x_1, x_2, x_3, \ldots x_n\}$ may be decomposed from Equation 2 into $P(x_1|y_1)/P(x_1)$, $P(x_2|y_1)/P(x_2)$, $P(x_3|y_1)/P(x_3)$, ... $P(x_n|y_1)/P(x_n)$ that are ratios of corresponding conditional use probabilities $P(x_1|y_1)P(x_2|y_1)P(x_3|y_1), \ldots P(x_n|y_1)P(y_1)$ of the respective chatbot sentence components $x_1, x_2, x_3, \ldots x_n$ assuming occurrence of the response event $y_1$ of the user over corresponding use probabilities $P(x_1), P(x_2), P(x_3) \ldots P(x_n)$ of the respective chatbot sentence components $x_1, x_2, x_3, \ldots x_n$. According to an increase in a value of $P(x_1|y_1)/P(x_1)$, $P(x_2|y_1)/P(x_2)$, $P(x_3|y_1)/P(x_3)$, ... $P(x_n|y_1)/P(x_n)$ that is a ratio of corresponding conditional use probability $P(x_1|y_1)$ $P(x_2|y_1)P(x_3|y_1), \ldots P(x_n|y_1)$ of each of the chatbot sentence components $x_1, x_2, x_3, \ldots x_n$ assuming the occurrence of the response event $y_1$ of the user over corresponding use probability $P(x_1), P(x_2), P(x_3) \ldots P(x_n)$ of each of the chatbot sentence components $x_1, x_2, x_3, \ldots x_n$, a probability that the response event $y_1$ occurs in response to each of the chatbot sentence components $x_1, x_2, x_3, \ldots x_n$ may be interpreted to increase.

Even with respect to response sentence components $y_2, y_3, \ldots y_m$, predicted response rate $P(y_2|x_1, x_2, x_3, \ldots x_n)$, $P(y_3|x_1, x_2, x_3, \ldots x_n), P(y_m|x_1, x_2, x_3, \ldots x_n)$ that responds to a single chatbot sentence $X=\{x_1, x_2, x_3, \ldots x_n\}$ may be calculated based on the same principle.

Therefore, in operation S410, the processor 220 may apply a Naïve bayes method based on $P(x_1|y_1)/P(x_1)$, $P(x_2|y_1)/P(x_2)$, $P(x_3|y_1)/P(x_3)$, ... $P(x_n|y_1)/P(x_n)$ that is a ratio of corresponding conditional use probability $P(x_1|y_1)$, $P(x_2|y_1)$, $P(x_3|y_1)$, ... $P(x_n|y_1)$, $P(x_1|y_2)$, $P(x_2|y_2)$, $P(x_3|y_2)$, ... $P(x_n|y_2)$, $P(x_1|y_3)$, $P(x_2|y_3)$, $P(x_3|y_3)$, ... $P(x_n|y_3)$, $P(x_1|y_m)$, $P(x_2|y_m)$, $P(x_3|y_m)$, ... $P(x_n|y_m)$ of each of the chatbot sentence components $x_1, x_2, x_3, \ldots x_n$ assuming occurrence of each of response events $y_1, y_2, y_3, \ldots y_m$ of the user over corresponding use probability $P(x_1), P(x_2), P(x_3) \ldots P(x_n)$ of each of the chatbot sentence components $x_1, x_2, x_3, \ldots x_n$ that is defined as a predicted response rate preset for each of the chatbot sentence components $x_1, x_2, x_3, \ldots x_n$ (i.e., probability that each of the response events $y_1, y_2, y_3, \ldots y_m$ occurs or occurred from the user in response to each of the chatbot sentence components $x_1, x_2, x_3, \ldots x_n$) and may calculate and predict the predicted response rate $P(y|x_1, x_2, x_3, \ldots x_n), P(y_2|x_1, x_2, x_3, \ldots x_n), P(y_3|x_1, x_2, x_3, \ldots x_n), \ldots P(y_m|x_1, x_2, x_3, \ldots x_n)$ for each of the response sentence components $y_1, y_2, y_3, \ldots y_m$ that may be input as the response event from the user for at least one chatbot sentence $X=\{x_1, x_2, x_3, \ldots x_n\}$ that is output from the chatbot (i.e., probability that each of the response events $y_1, y_2, y_3, \ldots y_m$ occurs from the user in response to the at least one chatbot sentence $X=\{x_1, x_2, x_3, \ldots x_n\}$).

For example, describing an example of predicting a predicted response rate for at least one chatbot sentence that is defined as a probability that each of response sentence components is input as a response event from a user in response to at least one chatbot sentence through a chatbot log as illustrated in FIG. 7B, sentence components of a chatbot sentence for a response sentence in which a sentence component "light" is used may be extracted as "aa," "bb," "shoes," "what," "shoes," and "like" from a first dialogue pair ["We have aa, bb shoes", and "aa looks light"], a second dialog pair ["We have aa, bb shoes", "bb has nice color"] and a third dialogue pair ["What other shoes do you like?", "light shoes"]. Therefore, the frequency of P("shoes"|"light") may be calculated as 2/6 and, if the frequency that "light" is used in the entire response sentence is 1/100, the frequency of P("shoes"|"light")/P("light") may be calculated as 2/6*100. That is, a probability that the response sentence component "light" for the chatbot sentence component "shoes" occurs may be calculated.

Therefore, in operation S420, the provider 320 included in the processor 220 may provide the predicted response rate of each of the response sentence components that respond to the at least one chatbot sentence. Hereinafter, providing the predicted response rate of each of the response sentence components that respond to the at least one chatbot sentence may represent that the processor 220 provides the predicted response rate of each of the response sentence components that respond to the at least one chatbot sentence to a company, that is, a client that desires to utilize a chatbot scenario creation service.

For example, referring to FIG. 8A, when first chatbot sentence $X^1=\{x_1, x_2, x_3, x_4\}$ and second chatbot sentence $X^2=\{x_5, x_6, x_7\}$ are received from a company, that is, a client, the processor 220 may compute predicted response rates $P(y_1|x_1, x_2, x_3, x_4)$, $P(y_2|x_1, x_2, x_3, x_4)$, and $P(y_3|x_1, x_2, x_3, x_4)$ at which response sentence components $y_1$, $y_2$, and $y_3$ are input from the user in response to the first chatbot sentence $X^1=\{x_1, x_2, x_3, x_4\}$, respectively, and predicted response rates $P(y_1|x_5, x_6, x_7)$, $P(y_2|x_5, x_6, x_7)$, and $P(y_3|x_5, x_6, x_7)$ at which the response sentence components $y_1$, $y_2$, and $y_3$ are input from the user in response to second chatbot sentence $X^2=\{x_5, x_6, x_7\}$, respectively, through operation S410 and then may provide the client with the predicted response rate $P(y_1|x_1, x_2, x_3, x_4)$, $P(y_2|x_1, x_2, x_3, x_4)$, and $P(y_3|x_1, x_2, x_3, x_4)$ at the response sentence components $y_1$, $y_2$, and $y_3$ are input from the user in response to the first chatbot sentence $X^1=\{x_1, x_2, x_3, x_4\}$, respectively, and the predicted response rates $P(y_1|x_5, x_6, x_7)$, $P(y_2|x_5, x_6, x_7)$, and $P(y_3|x_5, x_6, x_7)$ at which the response sentence components $y_1$, $y_2$, and $y_3$ are input from the user in response to the second chatbot sentence $X^2=\{x_5, x_6, x_7\}$, respectively, through operation S420. Through this, the client is enabled to create a chatbot scenario by selecting the second chatbot sentence having a higher predicted response rate value for each of the response sentence components between the first chatbot sentence $X^1=\{x_1, x_2, x_3, x_4\}$ and the second chatbot sentence $X^2=\{x_5, x_6, x_7\}$. The processor 220 may complete creation of the chatbot scenario by performing the aforementioned operation in each of sentence portions (Chatbot Sentence 1, Chatbot Sentence 2, and Chatbot Sentence 3) that are output from the chatbot in the chatbot scenario of FIG. 8A.

Also, in operation S420, the processor 220 may provide the predicted response rate of each of the response sentence components for the at least one chatbot sentence and may also recommend at least one recommended chatbot sentence or at least one recommended chatbot sentence component based on the predicted response rate of each of the response sentence components for the at least one chatbot sentence or the predicted response rate of each of the response sentence components for each of the chatbot sentence components.

For example, referring to FIG. 8B, when first chatbot sentence $X^1=\{x_1, x_2, x_3, x_4\}$ and second chatbot sentence $X^2=\{x_5, x_6, x_7\}$ are received from a company, that is, a client, the processor 220 may predict predicted response rates $P(y_1|x_1, x_2, x_3, x_4)$, $P(y_2|x_1, x_2, x_3, x_4)$, and $P(y_3|x_1, x_2, x_3, x_4)$ at which sentence components $y_1$, $y_2$, and $y_3$ are input from the user in response to the first chatbot sentence $X^1=\{x_1, x_2, x_3, x_4\}$, respectively, and predicted response rates $P(y_1|x_5, x_6, x_7)$, $P(y_2|x_5, x_6, x_7)$, and $P(y_3|x_5, x_6, x_7)$ at which the response sentence components $y_1$, $y_2$, and $y_3$ are input from the user in response to the second chatbot sentence $X^2=\{x_5, x_6, x_7\}$, respectively, through operation S410 and then may provide the client with the predicted response rates $P(y_1|x_1, x_2, x_3, x_4)$, $P(y_2|x_1, x_2, x_3, x_4)$, and $P(y_3|x_1, x_2, x_3, x_4)$ at which the response sentence components $y_1$, $y_2$, and $y_3$ are input from the user in response to the first chatbot sentence $X^1=\{x_1, x_2, x_3, x_4\}$, respectively, and the predicted response rates $P(y_1|x_5, x_6, x_7)$, $P(y_2|x_5, x_6, x_7)$, and $P(y_3|x_5, x_6, x_7)$ at which the response sentence components $y_1$, $y_2$, and $y_3$ are input from the user in response to the second chatbot sentence $X^2=\{x_5, x_6, x_7\}$, respectively, through operation S420. At the same time, the processor 220 may recommend recommended chatbot sentence $X^3=\{x_8, x_9\}$ or recommended chatbot sentence components $x_8$ and $x_9$ having a higher predicted response rate value for each of the response sentence components than the first chatbot sentence $X^1=\{x_1, x_2, x_3, x_4\}$ and the second chatbot sentence $X^2=\{x_5, x_6, x_7\}$ to the client. Therefore, the client may select the recommended chatbot sentence $X^3=\{x_8, x_9\}$ and may create the chatbot scenario. The processor 220 may complete creation of the chatbot scenario by performing the aforementioned operation in each of sentence portions (Chatbot Sentence 1, Chatbot Sentence 2, and Chatbot Sentence 3) that are output from the chatbot in the chatbot scenario of FIG. 8B.

Also, in operation S420, the processor 220 may provide the predicted response rate of each of the response sentence components for the at least one chatbot sentence and may also provide at least one specific sentence component having the predicted response rate greater than or equal to a preset value among the response sentence components or a combination thereof.

For example, referring to FIGS. 8A and 8B, when the predicted response rates $P(y_1|x_1, x_2, x_3, x_4)$, $P(y_2|x_1, x_2, x_3, x_4)$, and $P(y_3|x_1, x_2, x_3, x_4)$ at which the response sentence components $y_1$, $y_2$, and $y_3$ are input from the user in response to the first chatbot sentence $X_1=\{x_1, x_2, x_3, x_4\}$, respectively, and the predicted response rates $P(y_1|x_5, x_6, x_7)$, $P(y_2|x_5, x_6, x_7)$, and $P(y_3|x_5, x_6, x_7)$ at which the response sentence components $y_1$, $y_2$, and $y_3$ are input from the user in response to the second chatbot sentence $X^2=\{x_5, x_6, x_7\}$, respectively, the processor 220 may provide the client with specific sentence components $y_1$ and $y_2$ having the predicted response rate greater than or equal to the preset value among the response sentence components $y_1$, $y_2$, and $y_3$. Therefore, the client may recognize that the predicted response rate of each of the specific sentence components $y_1$ and $y_2$ is high and may generate a chatbot sentence that induces the specific sentence components $y_1$ and $y_2$.

Also, when a predicted response rate of each of response sentence components for at least one chatbot sentence is provided to a client and a chatbot service is provided to the user according to a chatbot scenario created by the client, the processor 220 may update the predicted response rate for each of the chatbot sentence components that constitute the at least one chatbot sentence based on a result of inputting a specific response sentence component as the response event from the user as the at least one chatbot sentence is provided to the user. As described above, since the predicted response rate for each of the chatbot sentence components may be continuously updated with the chatbot scenario creation method being performed, prediction accuracy of the predicted response rate of the chatbot sentence may be improved.

Although it is described that the chatbot scenario creation method provides a predicted response rate of each of response sentence components that respond to at least one chatbot sentence to a client such that the client may create a chatbot scenario by applying the predicted response rate of each of the response sentence components that respond to the at least one chatbot sentence, it is provided as an example only. Without being limited thereto or restricted thereby, at least one final chatbot sentence may be automatically generated based on the predicted response rate of each of the response sentence components that respond to the at least one chatbot sentence. In this case, in operation S420, the processor 220 may create the chatbot scenario by automatically generating at least one final chatbot sentence having the highest predicted response rate for each of the response sentence components based on the predicted response rate of each of the response sentence components that respond to the at least one chatbot sentence. A process of automatically generating at least one final chatbot sentence may include selecting one chatbot sentence having the highest predicted response rate for each of the response sentence components as the final chatbot sentence from among a plurality of chatbot sentences as described above with reference to FIG. 8A, or generating the final chatbot sentence by recommending a new chatbot sentence or chatbot sentence components having a high predicted response rate for each of the response sentence components as described above with reference to FIG. 8B.

As described above, according to some example embodiments, the creation system may propose a chatbot scenario creation method by providing a predicted response rate of each of response sentence components that respond to a chatbot sentence and by applying the predicted response rate of each of the response sentence components, thereby improving a user satisfaction for a customer service provided through a chatbot and improving advertising effect for advertising of a company exposed through the chatbot.

Hereinafter, an example of implementing the aforementioned creation system is described with reference to FIG. 9.

Figure 9:
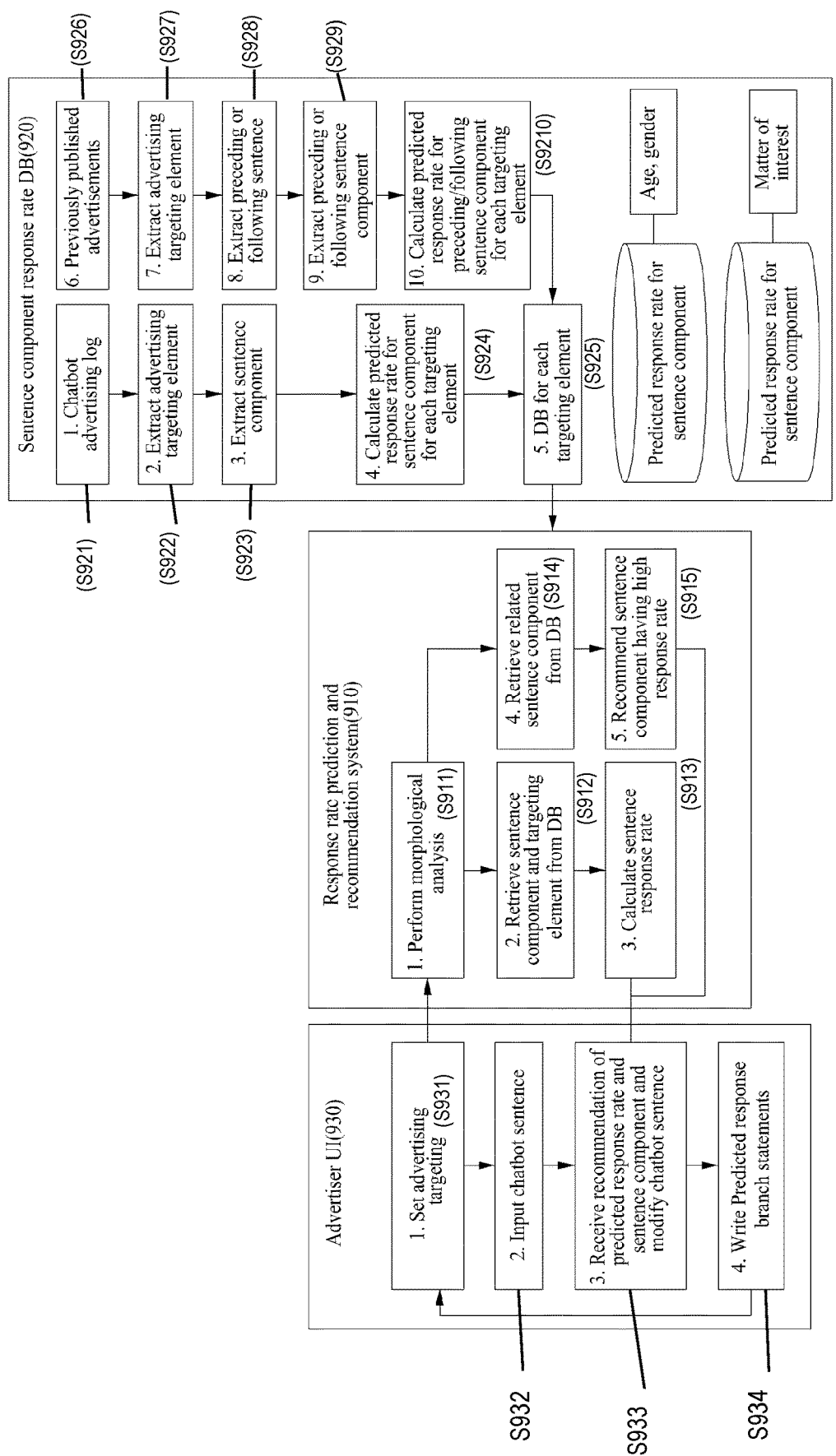
FIG. 9 is a diagram illustrating an example of a chatbot scenario creation system using a chatbot scenario creation method according to an example embodiment.

FIG. 9 illustrates an example of a chatbot scenario creation system using a chatbot scenario creation method according to an example embodiment.

Referring to FIG. 9, the chatbot scenario creation system may include a response rate prediction and recommendation system 910 configured to predict and provide a predicted response rate and a sentence component response rate database 920 configured to preset and calculate a predicted response rate of a sentence component and may provide a chatbot scenario creation service to an advertiser through an advertiser user interface (UI) 930.

The advertiser UI 930 may receive a user input for setting an advertising target which is also referred to as a target audience, and which involves with a target demographic and target interests (S931) and may obtain an input sentence to be used as a chatbot sentence (S932). The target demographic may include factors such as age, gender, location, income level, and occupation of the target audience. The target interests may include hobbies, preferences, behaviors, or specific areas of focus that align with the advertiser's product or service.

In response thereto, the response rate prediction and recommendation system 910 may perform preprocessing, such as morphological analysis, on the input sentence that is input from the advertiser through the advertiser UI 930 (S911) and may extract chatbot sentence components (e.g., keywords) (S912 and S914). The response rate prediction and recommendation system 910 may retrieve a predicted response rate in consideration of a targeting element for the chatbot sentence components using the sentence component response rate database 920 (S912) and may calculate a predicted response rate of the user for the input sentence based on the retrieved predicted response rate for each of the chatbot sentence components and may provide the predicted response rate to the advertiser through the advertiser UI 930 (S913).

Here, in a process of providing a response rate for the input sentence, the response rate prediction and recommendation system 910 may retrieve a related sentence component having a response rate greater than or equal to a preset value for the chatbot sentence components (S914) and may recommend the related sentence component having the high response rate to the advertiser through the advertiser UI 930 (S915).

Therefore, the advertiser may write predicted response branch statements for the chatbot sentence using the provided predicted response rate of the user for the input sentence or the recommended related sentence component (S933 and S934).

The sentence component response rate database 920 used in the aforementioned series of process may be configured in advance before providing the chatbot scenario creation service and maintained. For example, the predicted response rate for each of the chatbot sentence components may be calculated in advance based on a probability that a response event occurred from users for each of the chatbot sentence components in a past scenario provided from the chatbot or a probability that the response event occurred from the users for each of the chatbot sentence components included in advertising texts of an advertising log provided from the chatbot and thereby be stored in the sentence component response rate database 920 (S921-S925). If the predicted response rate for each of the chatbot sentence components may not be calculated only with the past scenario or the advertising log provided from the chatbot, the predicted response rate for each of the chatbot sentence components may be calculated by further using advertising phrases of previously published advertisements (advertisements published by other advertisers irrelevant to the chatbot) in addition to the advertising log provided from the chatbot (S926-929 and S9210).

A targeting element may be considered in a process of calculating the predicted response rate for each of the chatbot sentence components. For example, since a predicted response rate of a target user for a chatbot sentence component is matched and stored in the sentence component response rate database 920, the response rate prediction and recommendation system 910 may retrieve the predicted response rate matched for the target user and may consider the targeting element in a process of retrieving the predicted response rate for each of the chatbot sentence components.

Also, when calculating in advance the predicted response rate for each of the chatbot sentence components, a predicted response rate of a sentence component located ahead of or following a specific chatbot sentence component may also be calculated together with calculating a predicted response rate of the specific chatbot sentence component. Here, the sentence component located ahead of or following the specific chatbot sentence component represents that the sentence component precedes or follows in an advertising phrase or a past scenario used to calculate the predicted response rate of the specific chatbot sentence component. Therefore, in a process of providing the predicted response rate of the specific chatbot sentence component, a sentence component corresponding to a predicted response rate greater than or equal to a preset value between a predicted response rate of the preceding sentence component and a predicted response rate of the following sentence component may be further provided as a related sentence component.

The apparatuses described above may be implemented using hardware components, software components, and/or a combination thereof. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel configuration.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of creating a chatbot scenario performed by a computer device comprising at least one processor, the method comprising:
   obtaining chatbot sentence components and at least one chatbot sentence including the chatbot sentence components from a chatbot;
   outputting the at least one chatbot sentence to a user;
   predicting a response rate of the user for the at least one chatbot sentence based on a predicted response rate that is predetermined for each of the chatbot sentence components, the predicted response rate based on probabilities that a response event occurs from the user for each of the chatbot sentence components;
   providing the predicted response rate for the at least one chatbot sentence; and
   updating the predicted response rate for each of the chatbot sentence components that constitute the at least one chatbot sentence based on a result of the response event occurring from the user as the at least one chatbot sentence is outputted to the user.

2. The method of claim 1, wherein the predicted response rate for each of the chatbot sentence components is calculated in advance based on a probability that the response event occurred from users for each of the chatbot sentence components in a past scenario provided from the chatbot or a probability that the response event occurred from the users for each of the chatbot sentence components included in advertising texts.

3. The method of claim 1, wherein the providing further comprises recommending at least one recommended chatbot sentence or at least one recommended chatbot sentence component based on the predicted response rate for the at least one chatbot sentence or the predicted response rate for each of the chatbot sentence components.

4. The method of claim 1, wherein the predicting comprises predicting the predicted response rate of the user for the at least one chatbot sentence by applying a Naïve bayes method based on a predicted response rate preset for each of the chatbot sentence components.

5. The method of claim 1, wherein the predicted response rate is represented by a probability that each of response sentence components is to be input as the response event from the user.

6. The method of claim 5, wherein the predicted response rate for each of the chatbot sentence components is calculated in advance based on a probability that each of the response sentence components is input as the response event from users for each of the chatbot sentence components in a past scenario provided from the chatbot or a probability that each of the response sentence components is input as the response event from the users for each of the chatbot sentence components included in advertising texts.

7. The method of claim 6, wherein the providing further comprises updating the predicted response rate for each of chatbot sentence components that constitute the at least one chatbot sentence based on a result of inputting a specific response sentence component as the response event from the user as the at least one chatbot sentence is provided to the user.

8. The method of claim 5, wherein the predicting comprises predicting the predicted response rate of each of the response sentence components capable of being input as the response event from the user in response to the at least one chatbot sentence, and the providing comprises providing the predicted response rate of each of the response sentence components that respond to the at least one chatbot sentence.

9. The method of claim 8, wherein the providing further comprises providing at least one specific sentence component having the predicted response rate greater than or equal to a preset value among the response sentence components or a combination thereof.

10. The method of claim 8, wherein the providing further comprises recommending at least one recommended chatbot sentence or at least one recommended chatbot sentence component based on the predicted response rate of each of the response sentence components for the at least one chatbot sentence or the predicted response rate of each of the response sentence components for each of the chatbot sentence components.

11. A non-transitory computer-readable recording medium storing instructions that, when executed by a processor, cause the processor to execute a method of creating a chatbot scenario, the method comprising:

obtaining chatbot sentence components and at least one chatbot sentence including the chatbot sentence components from a chatbot;

outputting the at least one chatbot sentence to a user;

predicting a response rate of the user for the at least one chatbot sentence based on a predicted response rate that is predetermined for each of the chatbot sentence components, the predicted response rate based on probabilities that a response event occurs from the user for each of the chatbot sentence components;

providing the predicted response rate of the user for the at least one chatbot sentence; and updating the predicted response rate for each of the chatbot sentence components that constitute the at least one chatbot sentence based on a result of the response event occurring from the user as the at least one chatbot sentence is outputted to the user.

12. A computer device for performing a method of creating a chatbot scenario, the computer device comprising:

at least one processor configured to execute computer-readable instructions to:

obtain chatbot sentence components and at least one chatbot sentence including the chatbot sentence components from a chatbot;

output the at least one chatbot sentence to a user;

predict a response rate of the user for the at least one chatbot sentence based on a predicted response rate that is predetermined for each of the chatbot sentence components, the predicted response rate based on probabilities that a response event occurs from the user for each of the chatbot sentence components;

provide the predicted response rate for the at least one chatbot sentence; and update the predicted response rate for each of the chatbot sentence components that constitute the at least one chatbot sentence based on a result of the response event occurring from the user as the at least one chatbot sentence is outputted to the user.

13. The computer device of claim 12, wherein the predicted response rate for each of the chatbot sentence components is calculated in advance based on a probability that the response event occurred from users for each of the chatbot sentence components in a past scenario provided from the chatbot or a probability that the response event occurred from the users for each of the chatbot sentence components included in advertising texts.

14. The computer device of claim 12, wherein the at least one processor is configured to recommend at least one recommended chatbot sentence or at least one recommended chatbot sentence component based on the predicted response rate for the at least one chatbot sentence or the predicted response rate for each of the chatbot sentence components.

15. The computer device of claim 12, wherein the predicted response rate is represented by a probability that each of response sentence components is to be input as the response event from the user.

16. The computer device of claim 15, wherein the predicted response rate for each of the chatbot sentence components is calculated in advance based on a probability that each of the response sentence components is input as the response event from users for each of the chatbot sentence components in a past scenario provided from the chatbot or a probability that each of the response sentence components is input as the response event from the users for each of the chatbot sentence components included in advertising texts.

17. The computer device of claim 15, wherein the at least one processor is configured to:

predict the predicted response rate of each of the response sentence components capable of being input as the response event from the user in response to the at least one chatbot sentence, and provide the predicted response rate of each of the response sentence components that respond to the at least one chatbot sentence.

18. The computer device of claim 17, wherein the at least one processor is configured to provide at least one specific sentence component having the predicted response rate greater than or equal to a preset value among the response sentence components or a combination thereof.

19. The computer device of claim 17, wherein the at least one processor is configured to recommend at least one recommended chatbot sentence or at least one recommended chatbot sentence component based on the predicted response rate of each of the response sentence components for the at least one chatbot sentence or the predicted response rate of each of the response sentence components for each of the chatbot sentence components.

* * * * *